Aug. 26, 1924.
F. X. LAUTERBUR
MIXER
Filed June 18, 1923
1,506,128
5 Sheets-Sheet 5
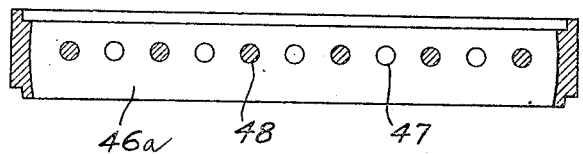
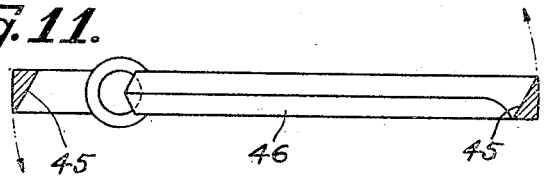
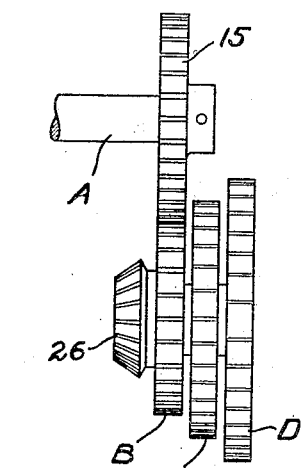
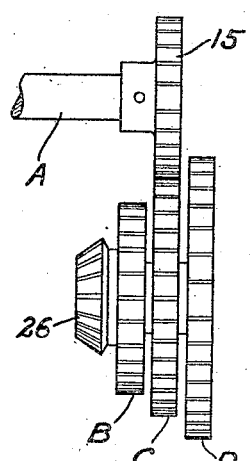
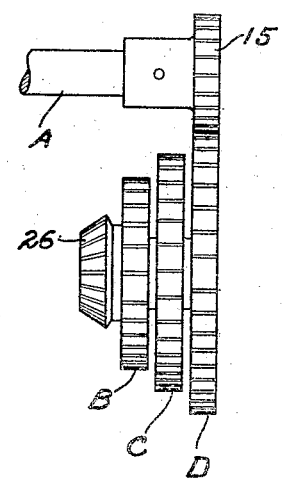
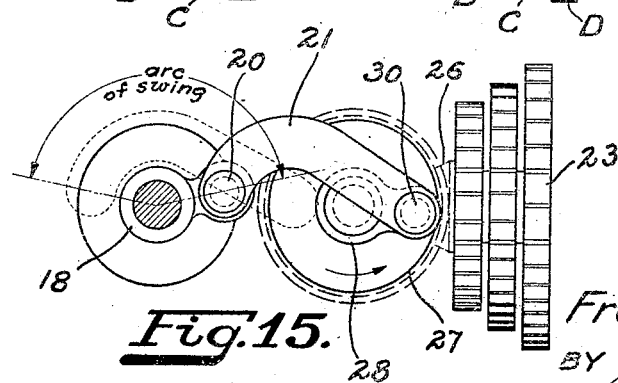
Inventor:
Frank X. Lauterbur.

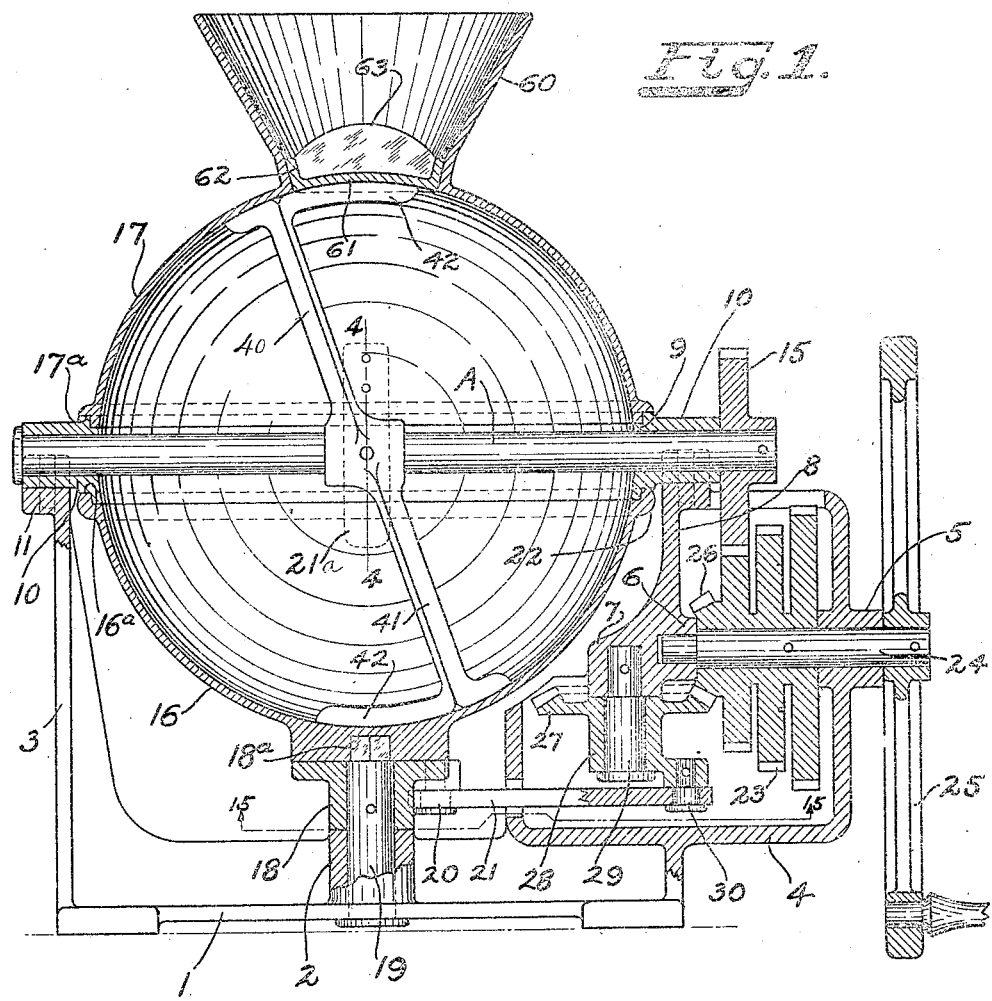

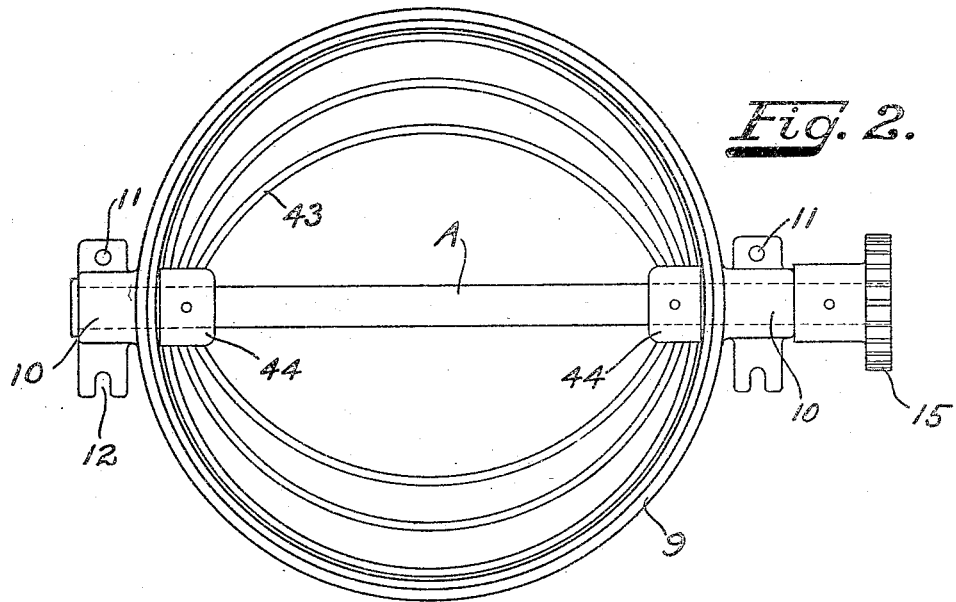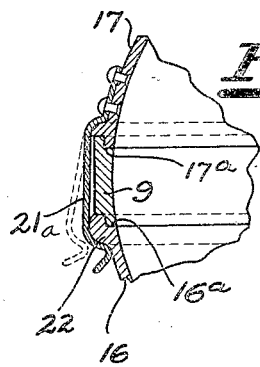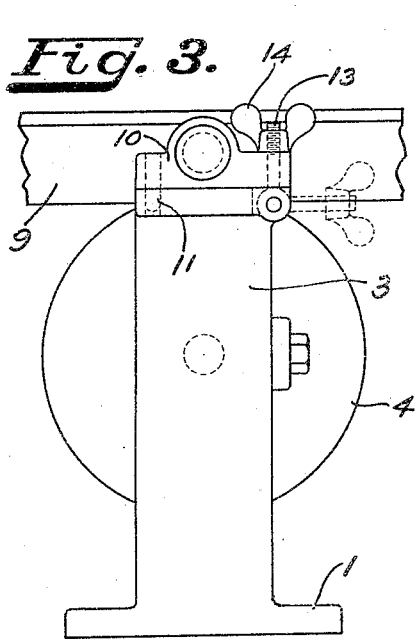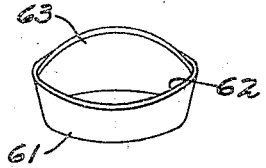

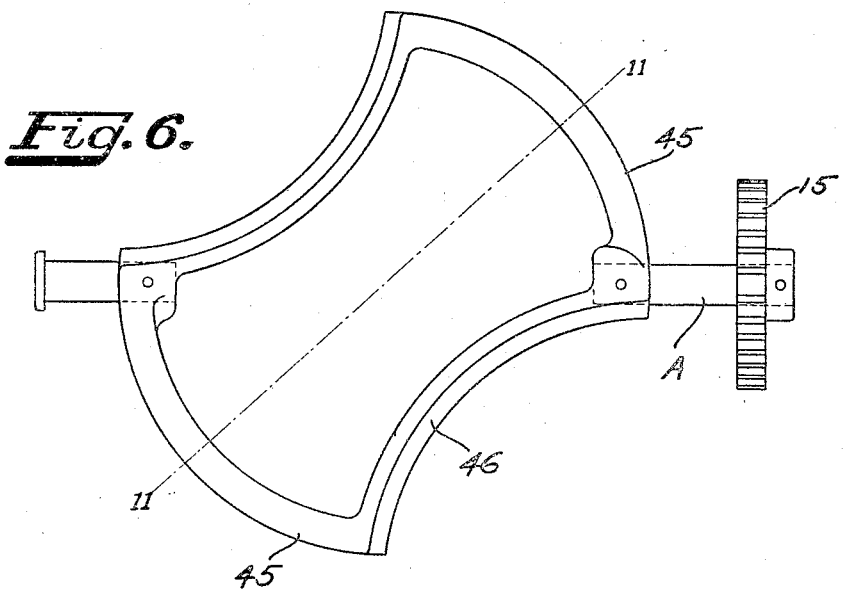
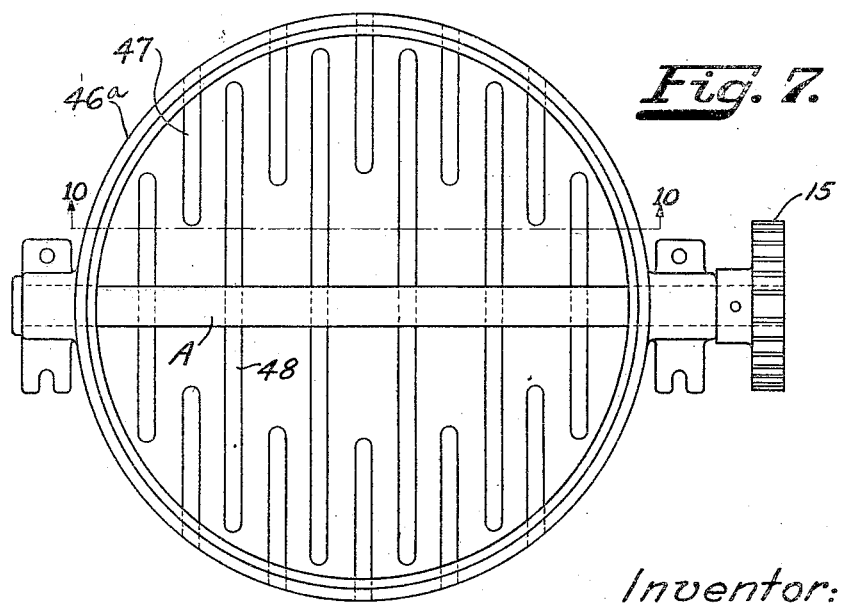

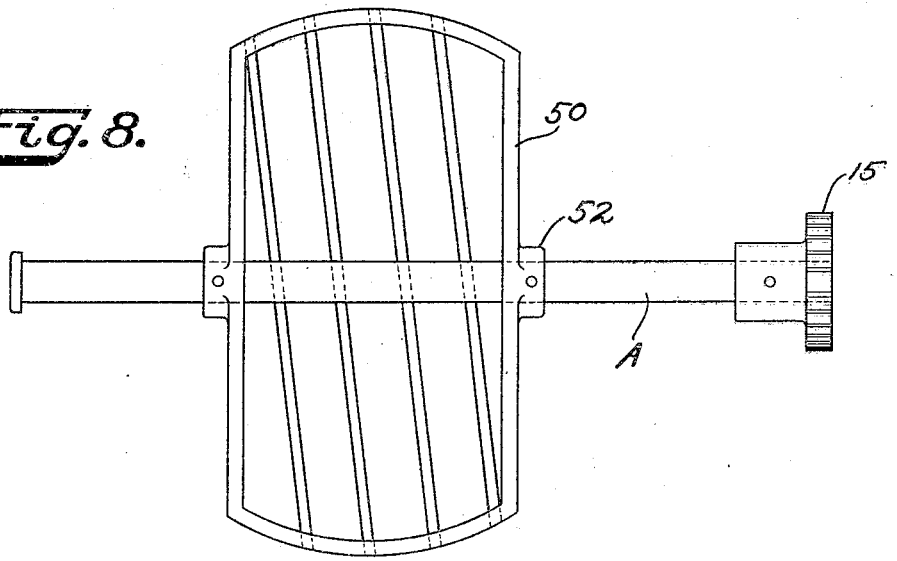
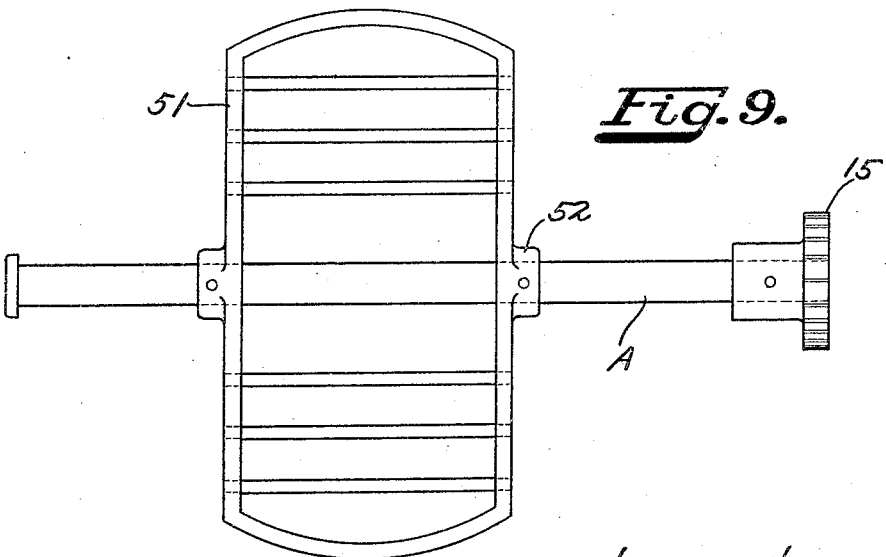

Patented Aug. 26, 1924.

1,506,128

UNITED STATES PATENT OFFICE.

FRANK X. LAUTERBUR, OF SIDNEY, OHIO.

MIXER.

Application filed June 18, 1923. Serial No. 646,123.

*To all whom it may concern:*

Be it known that I, FRANK X. LAUTERBUR, a citizen of the United States, and a resident of Sidney, in the county of Shelby and State of Ohio, have invented certain new and useful Improvements in Mixers, of which the following is a full, clear, and exact description, reference being had to the accompanying drawings, forming part of this specification.

My invention relates to mixers wherein plastic substances are agitated and intermixed or liquids whipped and aerated, and relates to the provision of means whereby dead spaces are eliminated, and whereby the substances being acted upon are insured of contact with the moving mixing devices as to all parts thereof.

I am not aware of any structure in the past where a spherical container is used and caused to rotate or oscillate, and at the same time an agitator blade is caused to rotate within the container, on an axis of rotation at right angles to the axis of movement of the container. This I accomplish by my invention, and I thereby provide for a vessel in which the plastic or other substances cannot collect at any point which the agitator blade will not at some time reach.

In the treatment of the substances in a mixer, the tendency of them is to move away from the mixing blade and the oscillation or revolution of my container brings all substances which adhere to portions of its walls out of contact with the mixer blade, back into a position for contact with the blade. By a movement of the substances around with the container in one plane, and striking them with a mixer arm in another, I obtain a cross action which is obviously very effective.

In my device, also, the axis of movement of the mixer container may be vertical while the axis on which the blade moves may be horizontal, thereby bringing the blade to the lowermost point of the mixer, and picking up such materials as fall by gravity.

Also by the cross action, and structure providing agitating at a right angle plane to the container movement, I can use a very high speed, without danger of the mixer cutting a definite path through the material, and not affecting the parts thereof which are out of its path.

Others have provided for moving containers, revolving blades, in mixers, but none, to my knowledge have provided for the cross action noted, and at the same time moved the entire container. It is apparent that to move one part only, of a container, will permit the other part to set up dead spaces, or none-affected areas, to which material may adhere. In mixing operation the object is to obtain a homogeneous mass at the end of the operation, and by my device the necessary time to bring this homogeneous mixing about is greatly shortened, and the violence of agitation greatly increased.

Thus my device will not only accomplish the usual intermixing operation successfully, but will also function excellently as a cream whipper, egg beater, butter separator, or emulsifier.

I accomplish my objects as above set forth by that certain construction and arrangement of parts of which I will show and describe a complete example, and the novelty inherent in which I will set forth in the claims that follow.

In the drawings,

Figure 1 is a cross sectional elevation, having a mixing arm for dough or soft batters.

Figure 2 is a plan view of the bowl ring and a mixing arm or whip for egg whites, etc.

Figure 3, a fragmental end view of the frame and the bowl ring.

Figure 4, a fragmental view showing the spring latch that holds the upper bowl and the lower bowl together, taken on the line 4—4 of Figure 1.

Figure 5, a perspective view of the upper bowl funnel plug.

Figure 6, a plan view of another form of mixing arm for dough.

Figure 7, a plan view of the bowl ring and mixing arm for pie doughs.

Figure 8, a plan view of a mixing arm or beater for soft batters, etc.

Figure 9, a plan view of another form of mixing arm or beater for soft batters, etc.

Figure 10, a cross section taken at line 10—10, Figure 7.

Figure 11, a cross section taken at line 11—11, Figure 6.

Figure 12, a view of the mixing arm drive gears showing the gears in mesh for low speed.

Figure 13, a view of the mixing arm drive gears showing the gears in mesh for intermediate speed.

Figure 14, a view of the mixing arm drive gears showing the gears in mesh for high speed.

Figure 15, a plan view of the bowl oscillating movement, taken at line 15—15, Figure 1.

I have shown a frame having a base 1, and having a central boss 2, and a side standard 3. At the side of the base opposite the standard is a box 4 formed as part of the frame casting, formed with bosses or bearings 5 and 6, for the operating shaft, and with a boss 7 for the stud of an oscillating driver for the bowl. The box also serves to provide another standard 8, for the support of the bowl mixer shaft.

The structure shown regularly contemplates the use of a ring 9, which is mounted on the standards and is formed with bosses 10, 10, in which is carried a beater shaft A. The bosses are formed (Fig. 2) with a pin 11 therein to seat in sockets in the upper ends of the standards 3 and 8, and with notches 12 therein to be engaged by swing-bolts 13, on the standards, having nuts 14, whereby the bolts may be swung up to engage in the notches 12 and the nuts then tightened down to hold the rings fixedly in place.

As shown the shaft A has a gear 15 pinned thereon, and some form of a beater blade, as will be noted in a series of forms, mounted inside of the ring.

The beater bowl, as noted, is spherical and is formed of two vessels 16 and 17, each of slightly less than half a sphere, there being a groove 16ª in the ring for the bottom vessels and a groove 17ª in the ring for the top vessel thereby forming seats on the rings for the two vessels.

The bottom vessel 16 is seated on the top of a collar 18, and has a square socket 18ª, which engages the square end of the stud 19, which is thrust up from beneath the base in the central boss thereof, and pinned to the collar. The collar 18 is also formed with a pivot stud or wrist pin 20, on which is mounted a crank 21, by means of which the vessel is caused to swing about on its central vertical axis on the base of the frame.

The two vessels are secured together by any desired means. I have shown (Fig. 4) means formed of spring 21ª on the upper vessel which is of a length to pass over the outside of the ring and engage the bead 22 on the lower vessel. Several of these springs may be provided, and their grasp should be such as to hold the two parts of the bowl together so that they will oscillate as a unit. This is shown merely as a convenient method of securing the bowl parts together, as swing bolts or any other desired means could be employed.

As a drive, I have shown a series of gears 23 of different size mounted on a shaft 24, which is arranged in the bearings 5 and 6, above noted, and may be revolved by a hand wheel 25 or by motor, or in any other desired manner. A beveled gear 26 on the inner end of the shaft 25 meshes with a beveled gear 27 formed on a sleeve 28. The sleeve 28 is revolvable on a stud 29 held in the boss 7 of the frame.

The crank 21, for oscillating the bowl device, is pivoted eccentrically at 30 on the sleeve 28, so that when the shaft 24 is revolved (Fig. 15), the bowl is swung on its vertical axis through an arc limited by the contact of the engaging means of the two vessels forming the bowl, with the shaft journals in the connecting ring.

The gear 15 on the end of the beater shaft which happens to be in use, will mesh with one of the series of gears of different diameter, indicated at 23, so that when the ring and bowl are set together and mounted on the standards of the frame, the beater shaft will be driven around, on a horizontal axis.

The operation will then be to select the desired ring, and beater shaft, which may come already assembled, and arrange it, with the lower bowl vessel on its pivot stud, and the upper bowl on its seat, in the ring; the whole set on the standards, with the bowl sections secured to each other. The operating shaft is then revolved which will swing the bowl through about one half circle on a vertical axis and revolve the beater on a horizontal axis, the speed of the beater shaft with relation to the bowl being governed by the location and size of the gear on the end of the beater shaft.

Thus a true cross action may be had, with no part of the bowl providing a point for segregating of masses of whatever material is being treated, that are free of engagement by the beater. The relative speeds for different beaters can be arranged by the manufacturer, who will know best what speeds to use with different forms of beater.

The motion of the bowl is particularly good, as it is low at the end of its motion and rapid in its intermediate path, as will be evident from Fig. 15, since the thrust on the crank will be slow at the limits of motion of the eccentric which operates it.

In Figures 12, 13 and 14 I have shown arrangements which illustrate the driver on the beater shaft, there being shown beater shafts, with gears B, C and D, for slow, medium and fast driving of the beater.

In Figure 1 I have shown a beater mounted on the beater shaft which has two arms 40 and 41 on the end of which are shoes 42 that scrape the surface of the spherical bowl. This beater is adapted for doughs and soft batters.

In Figure 2 the beater is shown as formed of a series of concentric oval bent rods 43, held in a pair of collars 44 on the beater shaft. This form of beater is excellent as an egg whip.

In Figure 6 and Figure 11 is shown another form of dough beater arm in which the two arc shaped portions 45 together wipe practically the entire interior surface of the bowl, and having the connecting arms 46 between the portions 45, which are given a triangular cross section, of special form as indicated in the view in Fig. 11, so as to impart a feeding action to the dough.

In Figures 7 and 10 is shown a pie dough mixer. In this instance the ring as at 46ᵃ has a series of projecting pins 47, and the beater shaft is formed with a series of cross pins 48, which are off-set with relation to the pins 47, so that a thorough agitation and pulling about of the dough results.

In Figures 8 and 9 are shown special forms of beaters 50 and 51. I have not shown the mounting ring in connection with Figures 6, 8 and 9 but wish it understood that the beater shafts may be made up with the rings attached, or made up separately and the collars 52 of the beater arms, unpinned from the shafts and the gears slipped off, while the shafts are being thrust through the rings which are to be used in connection therewith.

It may be noted that the entire device can be shifted about easily, and the two bowl parts lifted away. As a convenient form of upper vessel I have shown the filling spout 60, formed as a funnel on the upper portion of the said vessel. This closure, Figures 1 and 5, is formed of a concave plate 61, having flanges or a rim 62 which fits snugly into the base of the funnel, and a central cross web 63, which serves as a handle.

In use, the parts are assembled as has been noted, and the batter, dough, egg whites or what not, introduced through the spout or funnel in the top vessel. The beating or mixing operation is then accomplished, after which the entire bowl device together with the beater shaft and the supporting ring may be lifted away, and the mix poured out through the spout. If a small quantity is used, the upper vessel and mixed blade and ring can be lifted away from the lower vessel, and then the lower vessel lifted out, away from its engagement on the end of the squared driving stud, so as to make its contents available.

The two bowl section may be cleaned independently of the mechanism of the device, as may the beaters.

I wish to note particularly that the kind of frame-work, and method of mounting parts, in its details, does not form an essential of my invention, which is directed to the provision of a spherical mixer, with both vessel and blade movement, in which the entire vessel moves, for the reasons heretofore indicated.

Having thus described my invention, what I claim as new and desire to secure by Letters Patent, is:—

1. In a mixer, the combination of a bowl of substantially spherical shape, means for imparting a rotary movement to the bowl as a whole, a beater having a shaft revoluble within the bowl at an angle to the axis of movement of the bowl and means for operating the bowl and the beater simultaneously.

2. In a mixer, a ring having a beater mounted therein for movement in a plane at an angle to the plane of the ring, bowl sections engaging each other and located on both sides of the ring, which acts as a filler between them, and means for moving the bowl sections in a rotary path and for operating the beater.

3. In a mixer, a ring having a beater mounted therein for movement in a plane at an angle to the plane of the ring, bowl sections engaging each other, each of said sections engaging the ring as a seat, and slidable thereon, whereby the ring and the section form a complete bowl, and means for moving the bowl sections in a rotary path and for operating the beater.

4. In a mixer, a ring having a beater mounted therein for movement in a plane at an angle to the plane of the ring, substantially hemispherical bowl sections engaging each other and located on both sides of the ring, which acts as a filler between them, and means for moving the bowl sections in a rotary path and for operating the beater.

5. In combination a base and standards, an annular supporting element mounted fixedly on the standards, a bowl section mounted rotatably on the base and engaging the said element from below, another bowl section engaging the lower bowl section so as to be moved by it, and also engaging said element, thereby forming an enclosed bowl from said three members, a shaft mounted in said element, a beater device on said shaft, and power means having means engaging the lower bowl section to oscillate it in a rotary path, said means also engaging the shaft to impart rotary motion to it.

6. In combination an enclosed bowl having a spherical internal surface, a beater mounted diametrically of said bowl, and means for imparting oscillating rotary motion to the entire bowl and imparting motion to the beater simultaneously therewith, said beater motion being in another plane than the axis of motion of the bowl.

7. In combination a support, a fixed bowl section on said support, a pair of interconnected movable bowl sections forming with the fixed section an enclosed bowl, means for imparting motion of rotary nature to the interconnected bowl sections, and a beater mounted in the fixed section within the bowl so formed.

8. In combination a support, a fixed bowl section on said support, a pair of interconnected movable bowl sections forming with the fixed section an enclosed bowl, means for imparting motion of rotary nature to the interconnected bowl sections, and a beater mounted in the fixed section within the bowl so formed, said beater comprising a shaft extending out through the fixed section, and gearing on the shaft and on the support, for imparting rotary motion to the shaft.

9. In combination a support, a fixed bowl section on said support, a pair of interconnected movable bowl sections forming with the fixed section an enclosed bowl, means for imparting motion of rotary nature to the interconnected bowl sections, and a beater mounted in the fixed section within the bowl so formed, said beater comprising a shaft extending out through the fixed section, and gearing on the shaft and on the support, for imparting rotary motion to the shaft, said gearing mounted so as to come into mesh upon seating of the said fixed section on the support.

10. In combination a support, a fixed bowl section on said support, a pair of interconnected movable bowl sections forming with the fixed section an enclosed bowl, means for imparting motion of rotary nature to the interconnected bowl sections, and a beater mounted in the fixed section within the bowl so formed, said beater comprising a shaft extending out through the fixed section, and gearing on the shaft and on the support, for imparting rotary motion to the shaft, the means for imparting motion to the bowl comprising a crank device energized by said gearing.

11. In combination an enclosed bowl having a spherical internal surface, a beater, mounted diametrically of said bowl, and means for imparting oscillating rotary motion to the entire bowl and imparting motion to the beater simultaneously therewith but at an angle to the beater axis, the bowl motive means adapted to retard the motion of the bowl at the ends of its oscillating rotary movement.

12. In a mixer, a ring having a beater shaft mounted permanently therein, a beater on the shaft, said parts just named constituting a unit, a support on which said unit is seated, bowl sections co-operating with the ring to form a spherical bowl, also mounted on the support, and means for imparting rotary motion to the bowl sections, and to the said shaft.

13. In a mixer, a ring having a beater shaft mounted permanently therein, a beater on the shaft, said parts just named constituting a unit, a support on which said unit is seated, bowl sections co-operating with the ring to form a spherical bowl, also mounted on the support, and means for imparting rotary motion to the bowl sections, and to the said shaft, said support having quick detachable means to lock the ring in place.

14. In a mixing device, the combination of a support, a series of gears mounted on said support, a ring mounted on said support, a shaft mounted in said ring, and having a beater in connection therewith, a bowl mounted in connection with said ring, said shaft having a gear located thereon, the spacing of which along the shaft controls with which one of the series of gears it meshes.

15. In a mixing device, the combination of standards, a ring adapted to seat demountably in a definite position in said standards, a beater having a driving shaft mounted in said ring, a bowl mounted so as to be subject to said beater, a series of gears having means for driving them and mounted in connection with said standards, said shaft having a gear thereon adapted to mesh with the desired one of said series of gears upon locating the ring on said standards.

FRANK X. LAUTERBUR.